United States Patent [19]

Breidenbach et al.

[11] Patent Number: 4,495,031
[45] Date of Patent: Jan. 22, 1985

[54] TREATMENT OF GAS CONDENSATES

[75] Inventors: Dieter Breidenbach, Waltrop; Wilhelm Mosebach, Kamen-Methler; Winfried Dellmann, Kamen, all of Fed. Rep. of Germany

[73] Assignee: Firma Carl Still GmbH & Co. KG, Fed. Rep. of Germany

[21] Appl. No.: 494,348

[22] Filed: May 13, 1983

[30] Foreign Application Priority Data

May 26, 1982 [DE] Fed. Rep. of Germany ....... 3219701

[51] Int. Cl.³ .......................... C10B 57/00; C02F 1/44
[52] U.S. Cl. ........................................... 201/28; 55/54; 55/70; 210/651; 210/652; 210/750; 210/805; 210/806
[58] Field of Search .............................. 201/30, 29, 28; 210/652, 750, 805, 806, 195.2, 257.2, 433.2, 295, 651; 55/23, 27, 54, 70

[56] References Cited

U.S. PATENT DOCUMENTS

| 1,473,750 | 11/1923 | Wagner | 210/909 |
|---|---|---|---|
| 2,199,767 | 5/1940 | Wells | 210/909 |
| 4,132,535 | 1/1979 | Rivers | 55/23 |
| 4,132,636 | 1/1979 | Iwase | 210/909 |
| 4,160,725 | 7/1979 | Josis | 210/750 |
| 4,176,057 | 11/1979 | Wheatley | 210/652 |
| 4,311,597 | 1/1982 | Bhattacharyya | 210/750 |
| 4,366,063 | 12/1982 | O'Connor | 210/652 |

FOREIGN PATENT DOCUMENTS

| 211928 | 12/1957 | Australia | 210/909 |
|---|---|---|---|
| 228637 | 6/1960 | Australia | 210/909 |

OTHER PUBLICATIONS

Chemical Abstracts 86:174029(g).
Murdoch, "The Removal of Phenols From Gas Works Ammunical Liquor+ Paper Read at a Meeting of the Institution held in the Apartments of the Geological Society London, Oct. 8, 1946.
Hawley, The Condensed Chemical Dictionary, New York, Van Nostrand, 1966, p. 777.
Weesner "Reducing Phenol Wastes From Coke Plants", Steel Industry Action Committee of Ohio River Valley Water Sanitation Commission, Jan. 1953.
Chemical Abstracts 86:75759p.
Dytnerskii, "Membrane Methods of Separating Solutions and Their Possible Uses in Coking Plants" Khimiya, No. 9, pp. 36–38, 1976.

Primary Examiner—Ernest G. Therkorn
Attorney, Agent, or Firm—McGlew and Tuttle

[57] ABSTRACT

The invention makes possible a coking operation largely or completely eliminating waste water by converting the gas condensates obtained from the coking plant by a reverse osmosis process into a permeate which can be recycled to the coking operation, and a concentrated lye.

15 Claims, 2 Drawing Figures

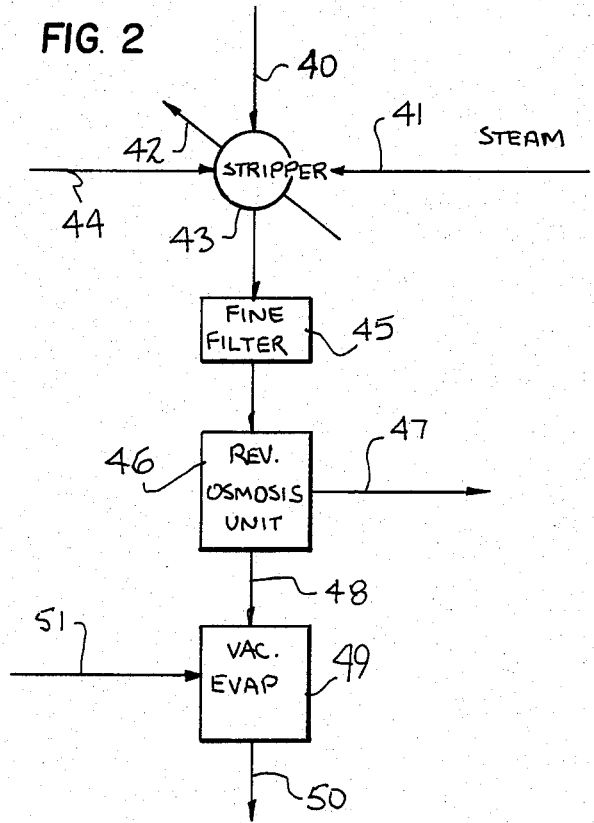

TREATMENT OF GAS CONDENSATES

FIELD AND BACKGROUND OF THE INVENTION

The invention relates to a method of treating gas condensates from a coking process or other processes of thermally upgrading coal.

During the thermal decomposition of bituminous coal in a coke oven, crude gas (coke-oven gas) is obtained in an amount and composition depending on the respective operating conditions and the nature of the coal undergoing carbonization. Component substances of the gas are, among others, $CO_2$, $CO$, $H_2$, $CH_4$, $C_nH_m$, $N_2$ and $O_2$. The crude gas contains tar, crude benzene, crude naphthalene, ammonia, and hydrogen sulfide. The gas further contains a substantial proportion of water vapor. The water vapor content of the gas includes the water content of the raw material, i.e. of the coal, and water of formation which is produced during the thermal decomposition of the coal in the coke oven by a partial oxidation of the hydrogen contained in the coal.

As the gases cool down, condensates form which are loaded to different degrees with components, depending on the raw materials and operating conditions during the carbonization. Substantial components of the condensates are sedimentary substances and substances which remain in suspension, as well as tar oils. Further formed in the gas condensates are phenols, pyridine, and some amounts of salts.

While processing coke oven gases, further condensates are obtained at various locations. This occurs, for example, in the benzene treatment, the sulfuric acid plant, and the gas compression.

The obtained gas condensates are processed as far as possible, to minimize the amount of waste water. With this in mind, a waste water free carbonization method has been sought in the past, with the use of the treated gas condensate as coke quenching water. This method could not prevail since the salt content, particularly of chlorides, of the gas condensates was too high.

SUMMARY OF THE INVENTION

The invention is directed to a method of making the carbonization operation waste water free. The invention starts from the idea of largely removing the salt load from the gas condensate. This is achieved, in accordance with the invention, by a reverse osmosis. By reversing the osmosis, the gas condensate is converted to a permeate which can be recycled into the coking process, and to a concentrated lye. The concentrated lye may be processed in an evaporator by means of waste heat which is available anyway in the coking plant. The permeate may be used, for example, in an ammonia scrubber, as additional water for the cooling circuit, or for controlling the circulation in the receivers, as well as for quenching the coke.

DESCRIPTION OF THE PREFERRED EMBODIMENTS

To preserve the modules, the condensates are filtered prior to entering the osmosis unit. The filtering equipment preferably comprises a back-flush filter, gravel filter, and superfine filter combination. By filtering, suspended matter which might cause fouling in the module, is removed from the condensates.

Providing the reverse osmosis downstream of the tar scrubber also extends the life of the modules.

The breaking up of the coke plant condensates by reverse osmosis into two fractions of very dissimilar nature can take place at various points of the coke oven gas processing operation (coal by-product plant). The reverse osmosis is intended particularly for being provided upstream or downstream of the dephenolation, or downstream of the ammonia scrubber.

In the following, two examples of the inventive processing of gas condensates are explained in more detail with reference to FIGS. 1 and 2.

EXAMPLE 1

| | |
|---|---|
| Coal charge | 1.000 t/d |
| $H_2O$ content | 10% |
| Water of formation | 3.5% |
| Condensate, total | 13% = 135 m$^3$/d |

The condensates are initially directed over a gravel filter and then through a tar scrubber or remover. Thereby, the sedimentary and suspension substances, and the tar oil are removed. This is followed by washing out the phenols with a heavy benzol mixture, with an efficiency of 92%. The salt content remains unaffected. Impurities are contained in the waste water in the following average amounts:

| | | |
|---|---|---|
| Phenols | 0.12 g/l | |
| Pyridine | 0.10 g/l | |
| Solid evaporation residue | 11.82 g/l | |
| liquid compounds | 2.80 g/l | |
| Salts, Total | 14.62 g/l | therefrom $NH_3$ total 6.43 g/l |
| | | $NH_3$ liquid 2.80 g/l |
| | | $NH_3$ fixed 3.63 g/l |
| | | Cl fixed 6.88 g/l = |
| | | 10.37 g $NH_4Cl$/l |

At an operating temperature of 35° C. and an operating pressure of 56 bar, a permeate output of 75% with a salt slip of 1.5% is obtained. In consequence, the following operating values may be expected:

| | |
|---|---|
| Permeates | 101.25 m$^3$/d |
| with a salt load of | 29.6 kg |
| Concentrate | 33.75 m$^3$/d |
| with a salt load of | 1 944.1 kg |

To dissolve the fixed ammonium salts, alkali in the form of NaOH is added.

Required NaOH amount:

135 m$^3$·3.63 kg/m$^3$·2.3485 = 1,150.9 kg + 10%
surplus = 1,266 kg/d

If the alkali is added as a 5% solution, the concentrate amount to be treated increases by 25.32 m$^3$ to 59.07 m$^3$. The salt load increases through the alkali addition from 1,944.1 kg by 1,266 kg to 3,210.1 kg. By treating the concentrate with steam in a stripper, the following amounts are released:

| | |
|---|---|
| | 855 kg $NH_3$ |
| | 372 kg $H_2S$, $CO_2$, HCN |
| total: | 1 227 kg |

The amount discharged from the stripper augments by the steam condensate to 65 m³ which contain 3,201.1 to 1,227=1,983.1 kg of salts, quite predominantly sodium chloride. This amount is processed in a vacuum evaporator operated with waste heat. The obtained salt is supplied for some commercial use, such as de-icing etc. If no use is made of alkali, the obtained salt is predominantly ammonium chloride.

EXAMPLE 2

The reverse osmosis is provided as far as at the outlet of the stripper. The salt amounts are the same as in example 1, yet the water amounts are different.

The 135 m³ of condensate coming from the dephenolation are mixed with sodium lye in 5% concentration to dissolve the fixed ammonium salts, so that the amount supplied to the stripper increases to 160 m³. The steam condensate further increases the amount discharged from the stripper to about 175 m³. Therefrom, 131 m³ of permeate are obtained in the reverse osmosis. The concentrate to be obtained by evaporation amounts to 44 m³.

As compared to example 1, the concentrate amount to be obtained is reduced by about ⅓rd. In both instances, any draining of waste water to the sewerage may be omitted, so that in this way, the sought waste water-free coking operation is achieved.

If the conventional dephenolation is omitted and the gas condensate is supplied to the reverse osmosis with its full phenol content, 95% of the phenols remain in the concentrate and are removed therefrom prior to the evaporation, by means of a dephenolation process known perse.

While providing the reverse osmosis for processing gas condensates in coking plants, the today required expensive cleaning equipment, such as biological clarifying plants, may be omitted. Not only fresh water is saved, but also charges for waste water are thereby avoided.

BRIEF DESCRIPTION OF THE DRAWINGS

Two embodiments of the invention are diagrammatically illustrated in the drawing in which:

FIG. 2 shows an arrangement with the inventive reverse osmosis provided downstream of the NH₃ strippers.

DETAILED DESCRIPTION OF THE DRAWINGS

Figure 1:
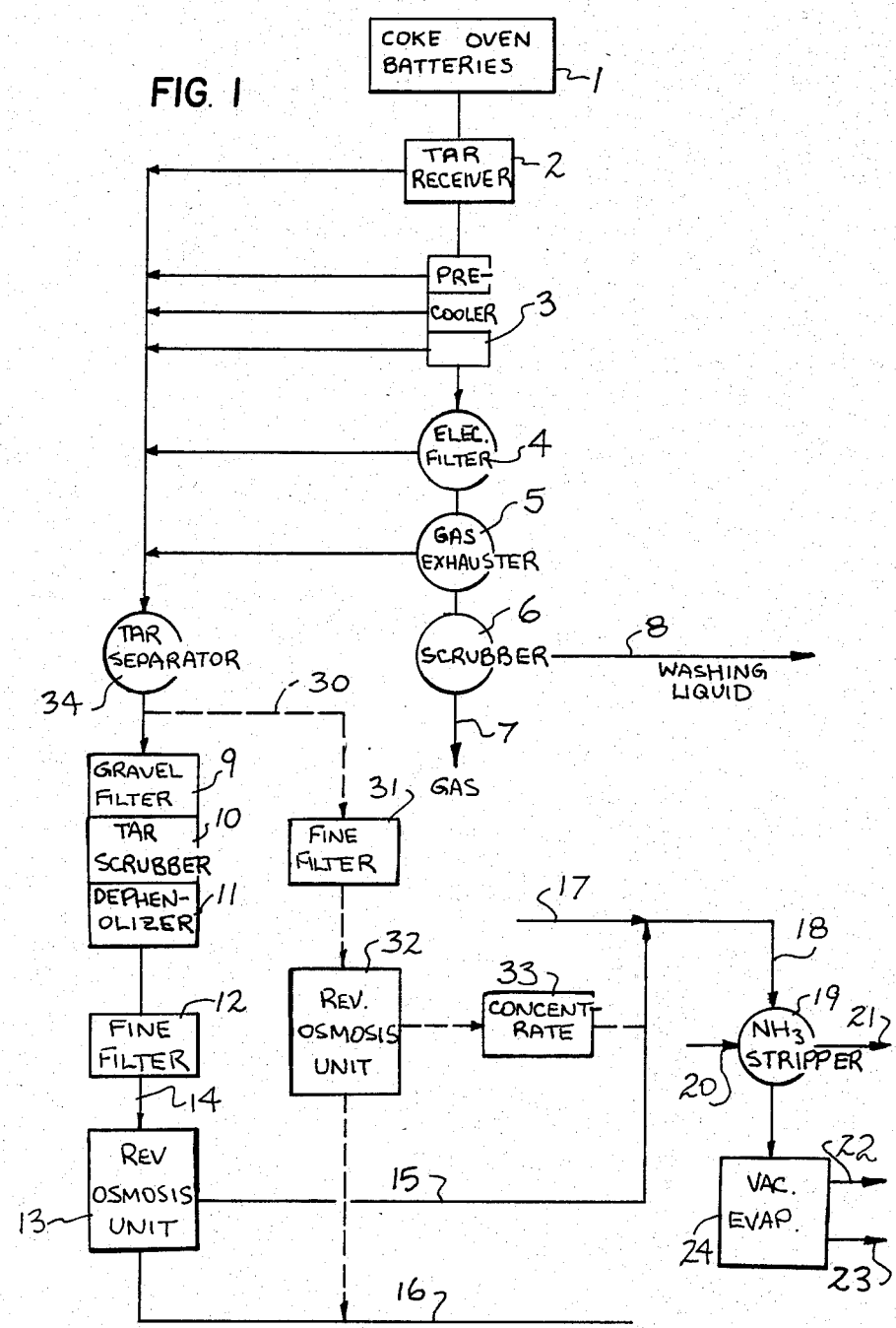
FIG. 1 is a flow chart of a crude gas processing method including the inventive reverse osmosis, with a dephenolizer upstream, and with a concentrate dephenolizer.

According to FIG. 1, the coke oven gases produced in coke oven batteries 1 having a capacity of 1,000 t per day are directed first to a tar receiver 2, then to a precooler 3, an electrofilter 4, and, through a gas exhauster 5, to a H₂S—NH₃ scrubber. In H₂S—NH₃ scrubber 6, gas 7 is obtained which is supplied to a benzol scrubber, while the washing liquid 8 is directed to the NH₃ plant.

Both in the tar receiver 2 as well as in the precooler 3, the electrofilter 4, and the gas exhauster 5, condensates accumulate which, according to FIG. 1, are conveyed through a tar separator 34 to a dephenolizer. In this way, before they reach dephenolizer 11, the condensates pass through a gravel filter 9 and a tar scrubber or remover 10.

The dephenolizer is followed by a fine filter 12 wherefrom the condensate enters the reverse osmosis unit 13. With a daily condensate accumulation via line 14 of 135 meter³, a concentrate amount of 33.75 m³ per day is obtained, comprising 1,944.1 kg of salts and a permeate amount of 101.25 m³ per day with 29.6 kg of salts. The permeate flowing out at 16 is reused in accordance with the invention, while the concentrate flowing out at 15 is supplied to a stripper 19. Prior to that, a 5% solution of NaOH in an amount of 25.32 m³ per day is added to the concentrate at 17, for example. This amount corresponds to 1,266 kg per day. Due to the NaOH addition, the concentrate amount supplied to the stripper increases to 59.07 m³ per day. By supplying steam at 20, as diagrammatically indicated, vapors are produced in NH₃ stripper 19, which are directed to further processing. Obtained are 855 kg of NH₃ and 372 kg of H₂S/CO₂/HCN. The residue is treated in vacuum evaporator 24. This produces a condensate which is directed to further utilization, and a salt which is usable for de-icing. The condensate outlet is indicated at 22, and the salt outlet at 23.

As an alternative to the above described dephenolation, a condensate processing without dephenolation is also possible. This alternative is indicated at 30 in FIG. 1, in broken lines. Again a starting amount of 135 m³ per day of condensate is assumed, which is supplied to a fine filter 31. Downstream of fine filter 31, a reverse osmosis unit 32 is provided. The output of reverse osmosis unit 32 are a concentrate 33, and a permeate. Concentrate 33 contains 95% of the phenol initially contained in the condensate. Concentrate 33 and the simultaneously obtained permeate are further processed in the same way as concentrate 15 and permeate 16.

According to FIG. 2, the condensate 40 obtained after a tar separation is supplied to a stripper 43. Again a starting supply amount of 135 m³ per day is assumed. Upon adding steam and NaOH, vapors are produced in the NH₃ stripper, which are directed to further processing, while the discharge is supplied to a fine filter 45. The NaOH addition is a 5% solution amounting to 25 m³ per day. The steam supply is diagrammatically indicated at 41, and the NaOH addition at 44. The daily amount discharged from NH₃ stripper 43 is 175 m³.

Downstream of fine filter 45, the condensate passes into a reverse osmosis unit 46. There, the permeate to be reused and the concentrate are produced. The discharge of permeate at 47 is 131 m³ per day, and the discharge of concentrate at 48 is 44 m³ per day.

The concentrate 48 passes into a vacuum evaporator 49 which is operated with waste heat supplied at 51. From the vacuum evaporator, salt is obtained, as in the example of FIG. 1, which may be used for de-icing. The salt discharge is diagrammatically indicated at 50.

We claim:

1. Method of treating a gas condensate recovered as waste water from the carbonization process or other themal process of upgrading coal for removing substantially the ammonium salt content therefrom prior to recycling the water to such process substantially to provide such process as a waste water-free process, which comprises subjecting the gas condensate to reverse osmosis treatment to convert the gas condensate to a permeate of correspondingly reduced salt content and constituting a reusable source of water for such process, and a concentrate of correspondingly increased salt content, recovering and recycling the permeate as a reusable source of water to such process, and subjecting the concentrate to lye treatment and to ammonia stripping treatment to form a lye treated salt containing stripped concentrate.

2. Method of claim 1, wherein the lye treated salt containing stripped concentrate is subjected to separation treatment to separate the lye treated salt content therefrom, and the separated lye treated salt content is recovered.

3. Method of claim 1, wherein the gas condensate is filtered prior to the reverse osmosis treatment.

4. Method of claim 1, wherein the gas condensate is subjected to tar removal treatment prior to the reverse osmosis treatment.

5. Method of claim 1, wherein the gas condensate is subjected to dephenolation treatment prior to the reverse osmosis treatment.

6. Method of treating a gas condensate recovered as waste water from the carbonization process or other thermal process of upgrading coal for removing substantially the ammonium salt content therefrom prior to recycling the water to such process substantially to provide such process as a waste water-free process, which comprises subjecting the gas condensate to lye treatment and to ammonia stripping to form a lye treated salt containing stripped gas condensate.

subjecting the lye treated salt containing stripped gas condensate to reverse osmosis treatment to convert said gas condensate to a permeate of correspondingly reduced salt content and constituting a reusable source of water for such process, and a concentrate of correspondingly increased lye treated salt content, and recovering and recycling the permeate as a reusable source of water to such process.

7. Method of claim 6, wherein the lye treated salt containing concentrate is subjected to separation treatment to separate the lye treated salt content therefrom, and the separated lye treated salt content is removed.

8. Method of claim 6, wherein the lye treated salt containing gas condensate is filtered prior to the reverse osmosis treatment.

9. Method of carrying out a carbonization process or other thermal process of upgrading coal in which water is used and a gas condensate is recovered as waste water, for treating the gas condensate for removing substantially the ammonium salt content therefrom prior to recycling the water to such process substantially to provide such process as a waste water-free process, which comprises subjecting the gas condensate to reverse osmosis treatment, and to lye treatment and ammonia stripping treatment, for converting the gas condensate via the reverse osmosis treatment to a gas condensate permeate of correspondingly reduced salt content and constituting a reusable source of water for such process, and a gas condensate concentrate of correspondingly increased salt content, and correspondingly for forming via the lye treatment and ammonia stripping treatment a lye treated salt containing stripped gas condensate, and recovering and recycling the permeate as a reusable source of water to such process.

10. Method of claim 9, wherein the gas condensate is subjected to the reverse osmosis treatment prior to the lye treatment and ammonia stripping treatment, and the lye treated salt containing stripped gas condensate as corresponding gas condensate concentrate of correspondingly increased salt content is thereafter subjected to separation treatment to separate the lye treated salt content therefrom, and the separated lye treated salt content is recovered.

11. Method of claim 10, wherein the gas condensate is filtered prior to the reverse osmosis treatment.

12. Method of claim 10, wherein the gas condensate is subjected to tar removal treatment prior to the reverse osmosis treatment.

13. Method of claim 10, wherein the gas condensate is subjected to dephenolation treatment prior to the reverse osmosis treatment.

14. Method of claim 9, wherein the gas condensate is subjected to the lye treatment and ammonia stripping treatment prior to the reverse osmosis treatment, and the lye treated salt containing stripped gas condensate as corresponding gas condensate concentrate of correspondingly increased salt content is thereafter subjected to separation treatment to separate the lye treated salt content therefrom, and the separated lye treated salt content is recovered.

15. Method of claim 14, wherein the gas condensate is filtered prior to the reverse osmosis treatment.

* * * * *